W. E. NETTLE, P. SELBY, J. BLYTH AND J. H. HOLMAN.
CONVEYING LIQUID TO ROCK DRILLING TOOLS.
APPLICATION FILED APR. 25, 1919.
1,339,858.  Patented May 11, 1920.
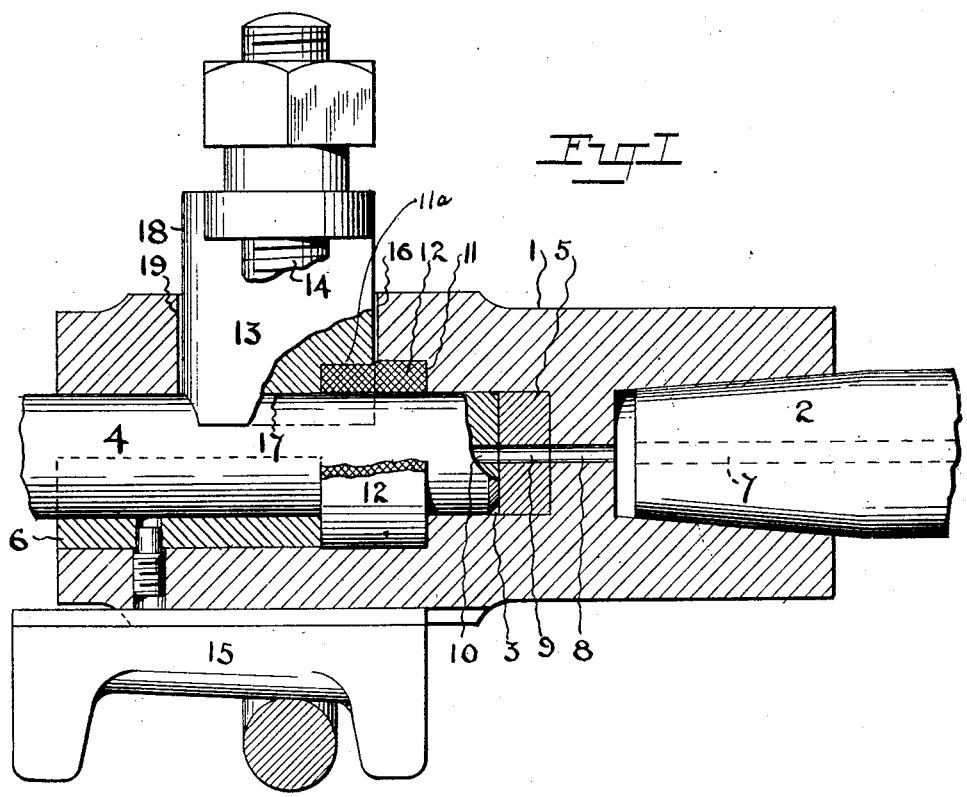
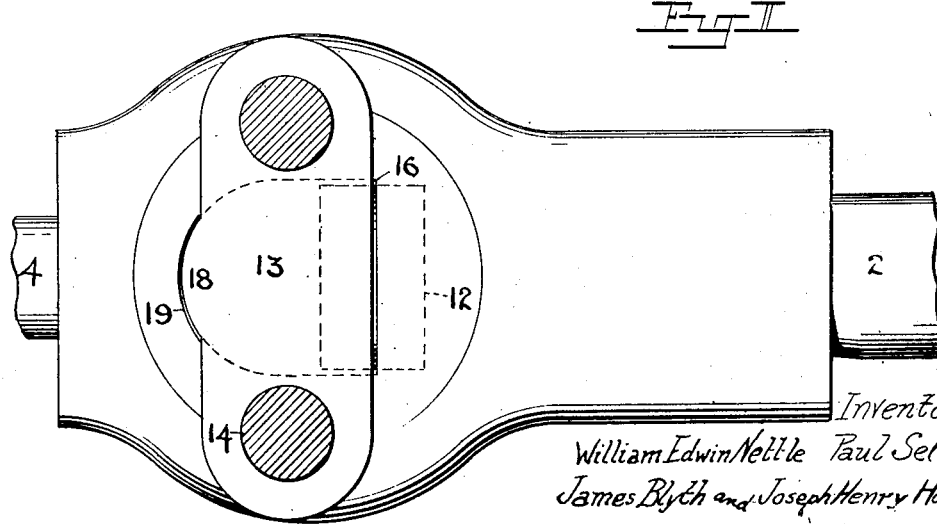
Inventors
William Edwin Nettle  Paul Selby
James Blyth and Joseph Henry Holman
by Laurence Langner
Attorney

UNITED STATES PATENT OFFICE.

WILLIAM EDWIN NETTLE, PAUL SELBY, JAMES BLYTH, AND JOSEPH HENRY HOLMAN, OF JOHANNESBURG, TRANSVAAL, SOUTH AFRICA.

CONVEYING LIQUID TO ROCK-DRILLING TOOLS.

1,339,858.  Specification of Letters Patent.  Patented May 11, 1920.

Application filed April 25, 1919. Serial No. 292,660.

*To all whom it may concern:*

Be it known that we, WILLIAM EDWIN NETTLE, PAUL SELBY, JAMES BLYTH, and JOSEPH HENRY HOLMAN, British subjects, residing at Ferreira Deep Limited, Johannesburg, Transvaal, Province of the Union of South Africa, have invented certain new and useful Improvements in Conveying Liquids to Rock-Drilling Tools, of which the following is a specification.

The present invention relates to rock drilling apparatus in which liquid is passed from a chuck into a hollow tool secured in the chuck. The purpose is to provide an effective joint between the tool and the chuck which is not readily destroyed by the insertion and withdrawal of the tool.

In the accompanying drawings,

Figure I is a longitudinal section of a chuck according to the invention, and

Fig. II is a plan.

1 indicates the chuck body which is suitably mounted on or formed integral with the piston rod 2.

3 is the socket in which the tool 4 is inserted. In the bottom of the socket is a hard steel bolster 5 and 6 is a renewable half bushing for the socket.

Water is passed from the bore 7 of the piston rod 2 through a hole 8 in the chuck, and a hole 9 in the bolster 5 into the socket 3, whence it passes along the bore 10 of the tool 4.

According to this invention, in order to prevent leakage of water between the tool and the chuck body, the socket 5 is counterbored to form an annular recess 11. In said recess is inserted a rubber or like resilient packing ring 12, the normal internal diameter of which is such that the tool 4 can easily pass through it. The ring fits closely in the recess 11, and provision is made for compressing said ring to cause it to make a tight joint with the walls of its recess 11 and with the surface of the tool 4. For so compressing the ring use is made of the means by which the tool is secured in the chuck, said means consisting in the present case of the well known combination of a pad 13, U bolt 14 and wedge 15. Accordingly the recess 11 is positioned to intersect the opening 16 through which the pad 13 enters the chuck body and the pad is recessed at 11ª to complete the recess 11.

Upon the pad being tightened down by means of the wedge 15 in the usual manner, its lower concave surface 17 grips upon the tool to hold the same, and at the same time its recessed part 11ª compresses the packing ring 12. The material of the packing ring is thereby displaced and forced into close contact both with the tool 4 and with the inclosing surfaces of its recess 11, thus effectually preventing the passing of fluid from the rear end of the socket 3 except through the bore of the tool. Upon the pad being loosened to release the tool the constriction of the packing ring on the tool is removed and the tool may be easily withdrawn without abrading the ring.

The front end of the pad is formed with a swelling 18 which enters a correspondingly shaped opening 19 in the front wall of the pad opening 16, while the back end of the pad is flat. This obviates insertion of the pad wrong way about and consequent cutting of the packing ring 12.

The packing can readily be passed into place through the pad opening 16, after the pad has been removed. The making of the joint is facilitated by using a tool with a circular shank as shown.

We claim:—

1. A rock drill chuck having a socket for the tool and an annular recess in said socket, a packing ring in said recess adapted to encircle a tool placed in the socket and common means to grip the tool and compress the packing ring.

2. The combination with a rock drill chuck of a pad for gripping a tool in said chuck, a resilient packing ring arranged in said chuck to surround the tool, the said packing ring being adapted to be compressed by movement of the pad to grip the tool and thereby form a joint between the chuck and the tool.

3. A rock drill chuck having a socket for the tool, and an opening intersecting said socket and adapted to receive a pad for gripping the tool, a recess in the bore adapted to receive a packing ring and intersecting the pad opening, a pad adapted to enter the pad opening, the inner end of such pad being shaped to grip a tool in the bore and being also recessed to form the continuation of the recess in the bore.

In testimony whereof we affix our signatures.

WILLIAM EDWIN NETTLE.
PAUL SELBY.
JAMES BLYTH.
JOSEPH HENRY HOLMAN.